United States Patent [19]

Buestgens

[11] Patent Number: 5,895,850

[45] Date of Patent: Apr. 20, 1999

[54] MICROMECHANICAL RESONATOR OF A VIBRATION GYROMETER

[75] Inventor: Burkhard Buestgens, Karlsruhe, Germany

[73] Assignee: Robert Bosch GmbH, Stuttgart, Germany

[21] Appl. No.: 08/716,328

[22] PCT Filed: Apr. 11, 1995

[86] PCT No.: PCT/DE95/00499

§ 371 Date: Sep. 24, 1996

§ 102(e) Date: Sep. 24, 1996

[87] PCT Pub. No.: WO95/29383

PCT Pub. Date: Nov. 2, 1995

[30] Foreign Application Priority Data

Apr. 23, 1994 [DE] Germany .................. 44 14 237

[51] Int. Cl.⁶ ........................................ G01P 9/04
[52] U.S. Cl. ............................. 73/504.12; 73/504.02
[58] Field of Search .................. 73/504.02, 504.12, 73/504.14, DIG. 1; 310/323

[56] References Cited

U.S. PATENT DOCUMENTS

| | | | |
|---|---|---|---|
| 4,656,383 | 4/1987 | Albert | 73/DIG. 1 |
| 4,710,668 | 12/1987 | Fima | 310/323 |
| 5,635,638 | 6/1997 | Geen | 73/504.12 |
| 5,635,640 | 6/1997 | Geen | 73/504.12 |

*Primary Examiner*—Christine K. Oda
*Attorney, Agent, or Firm*—Kenyon & Kenyon

[57] ABSTRACT

For a micromechanical resonator of a vibration gyrometer, the two resonating masses, which vibrate in phase opposition and are joined across a coupling region, are suspended by at least one suspension spring. The suspension springs are thereby designed to be soft in the direction of vibration and substantially harder in all other degrees of freedom. This allows the moment of rotation of the rate of rotation (absolute angular velocity) to be transferred to the resonating masses. Interference signals when measuring Coriolis forces are suppressed by means of subtraction. The resonator is patterned out of a semiconductor material and can be excited to vibrate in the electrostatic or electromagnetic field by means of suitable current supply leads.

8 Claims, 3 Drawing Sheets

MICROMECHANICAL RESONATOR OF A VIBRATION GYROMETER

FIELD OF THE INVENTION

The present invention is directed to a micromechanical resonator of a vibration gyrometer for detecting the rate of rotation (absolute angular velocity).

BACKGROUND INFORMATION

A vibration gyrometer, in which two resonating (vibrating) masses are patterned out of a silicon semiconductor crystal, is described in German Published Unexamined Application No. DE-OS 40 22 495. When working with the known vibration gyrometer, the problem occurs that the oppositely phased vibration of the two resonating masses of the vibration gyrometer does not remain stable in phase, e.g., when subjected to a temperature change. The Coriolis force that arises in response to a rotational pulse can not always be measured precisely enough in this case, so that this sensor is not able to demonstrate the high level of operational dependability required in certain applications, e.g., in motor vehicles.

Another vibration gyrometer is known from the publication, "A Micromachined Comb-Drive Tuning Fork Rate Gyroscope", IEEE, Feb. 93, pp. 143–148. Two resonating masses that oscillate in phase opposition are suspended so as to allow them to move normally to the substrate under the influence of Coriolis forces. These movements are detected electrostatically with the aid of fixed counter-electrodes situated on the substrate. However, this gyrometer is not so suited for use in an environment which is replete with vibrations, e.g. in a motor vehicle, since the resonator structure not only carries out the excitation vibration of the resonating structure, but also takes up movements coupled in from the remaining degrees of freedom. This can distort the measuring result.

SUMMARY OF THE INVENTION

An advantage of the micromechanical resonator of a vibration gyrometer according to the present invention is that the suspension springs are so designed that the two resonating masses, which are mechanically coupled across the coupling region and, thus, mutually excite each other, vibrate in absolute phase opposition. This results in stable phase conditions, since parameter changes, such as temperature fluctuations or different masses of the two resonating masses, do not have a disruptive effect. This yields the advantage that the micromechanical resonator of the vibration gyrometer can be equipped with separate, exactly specified sensors, e.g., for measuring the Coriolis forces. By making one or more of the suspension springs soft in the direction of vibration of the resonating masses and substantially harder in all other degrees of freedom, the transfer of the moment of rotation of the rate of rotation to the resonating masses is facilitated. In manufacturing the resonator, the further advantage is attained that the manufacturing tolerances can be relatively large and a special adjustment is not necessary. Therefore, it is especially cost-effective to manufacture the micromechanical resonator according to the present invention.

An especially beneficial design approach can be achieved in that both the coupling region comprising the coupling mass and the resonating springs, as well as the resonating masses, are each joined via at least one suspension spring to the substrate. A configuration of this type is mechanically relatively stable, in particular at high accelerations, as can occur, for example, in applications in a motor vehicle.

To keep the influence of the suspensions springs as small as possible, their spring stiffness is very soft in comparison to that of the resonating springs.

A simple design approach is achieved by forming a frame around or at least partially around the resonating masses, and by designing the frame at the same time as a coupling mass to which the two resonating masses are mechanically coupled via resonating springs. A structure of this type is able to be simply etched using known methods, e.g., out of a silicon wafer.

When the frame is used as a coupling mass, the effective coupling mass is all the smaller, the smaller the parts of the frame are designed. Given very small frame parts, the mass of the coupling mass is nearly zero, so that the phase relation of the two resonating masses is not influenced by the coupling mass.

When the rpm sensor is made of silicon material, a current can be conducted across the resonating masses via appropriate metallized conductors. If the resonating masses are situated in an electromagnetic field, which acts normally to the plane of vibration, the resonating masses can be excited to vibrate by the current.

DETAILED DESCRIPTION

Another contact-less actuation possibility is given by the use of a comb structure (electrostatic, reluctance actuation).

The resonator can be used universally in connection with suitable speed sensors, e.g., for measuring rate of rotation in motor vehicles, ships, airplanes, robots, or for measuring turbulence in liquids or gases.

Figure 1:
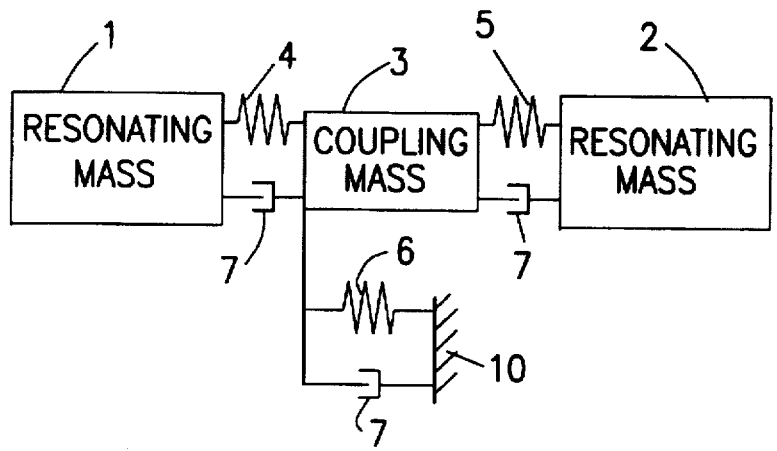
FIG. 1 illustrates a first mechanical equivalent circuit diagram according to the present invention.

FIG. 1 depicts a mechanical equivalent circuit diagram with two resonating masses 1, 2, which are joined by two resonating springs 4, 5. Disposed between the resonating springs 4, 5 is a coupling region comprising a coupling mass and resonating springs. The coupling mass 3 is connected by means of a suspension spring 6 to an external frame and to the substrate 10. As material for this rpm sensor, a semiconductor material, preferably silicon or silicon connections, is used. The silicon is so patterned using micromechanical methods that it constitutes both the masses as well as the springs. For the sake of clarity, electrical, metallized conductors, which are used to excite the masses to vibrate in an electrostatic or electromagnetic field, have been omitted in this block diagram. Arranged parallel to the springs 4, 5, 6 are damping elements 7, which are to be considered in calculating the rating (design) of the vibrational system.

Figure 2:
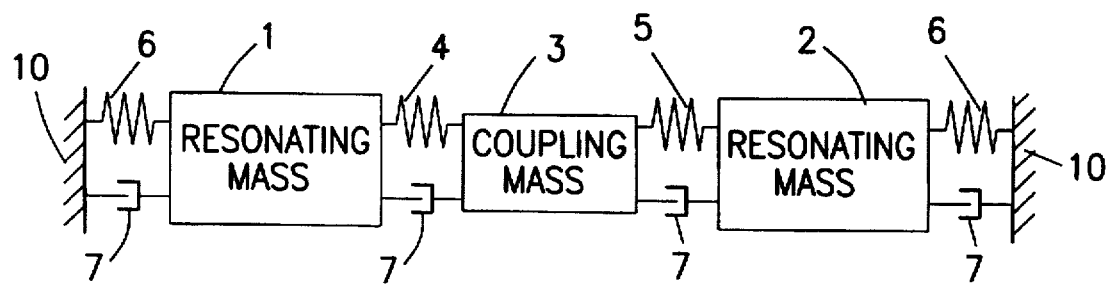
FIG. 2 illustrates a second mechanical equivalent circuit diagram according to the present invention.

FIG. 2 illustrates a second equivalent circuit diagram, which has a similar structure between the two resonating masses 1, 2 and the coupling mass 3. However, in this equivalent circuit diagram, the two resonating masses 1, 2 are directly connected via the suspension springs 6 to the substrate 10.

Figure 3:
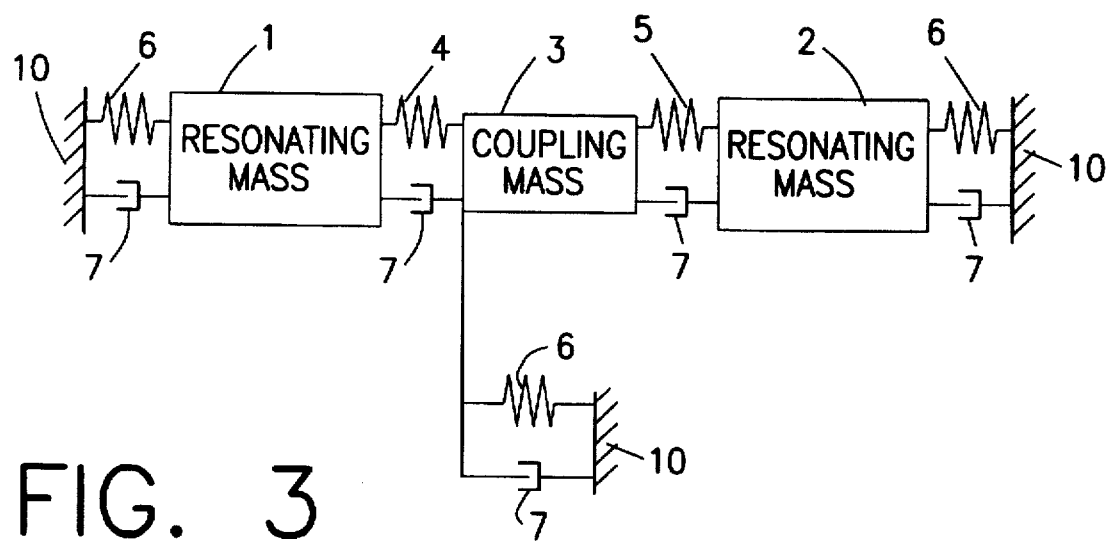
FIG. 3 illustrates a third mechanical equivalent circuit diagram according to the present invention.

FIG. 3 depicts a third equivalent circuit diagram, which represents a combination of the two previously named circuit diagrams. Here, both the two resonating masses 1, 2, as well as the coupling region comprising the coupling masses 3, are connected via the suspension springs 6 to the substrate 10.

In the following, the method of functioning of this arrangement is elucidated on the basis of several exemplary embodiments. The micromechanical resonator is also designated as a mechanical vibration gyrometer, appropriate sensors, e.g., speed sensors, being mounted on its resonating masses 1, 2. The mounted speed sensors comprise, inter alia, electrical circuits, whose current is supplied via printed conductors, which can be routed toward the outside by way of the suspension springs. A vibration gyrometer utilizes the effect that vibrating inert masses, which are subjected to a rotation, are deflected normally to their plane of vibration because of the Coriolis forces. The Coriolis forces can thereby be detected in many different ways using electromechanical conversion processes. A suitable sensor can be mounted on the resonating mass or indirectly measure the excursion of the resonating masses. One obtains a signal modulated by the oscillation frequency f, which through subsequent demodulation yields the desired measuring signal that is proportional to the rate of rotation f. Linear interference accelerations (transversal acceleration of the sensor), which are of the same direction as the Coriolis forces, produce an acceleration-interference signal, which is suppressed by the resonating masses vibrating in phase opposition. The vibration in phase opposition of the resonating masses 1, 2 cancels out the inertial forces. On the other hand, the Coriolis forces act in opposite directions on the two resonating masses 1, 2, the interference-acceleration forces, however, in the same direction. By forming the difference between the signals from two identical, ideal, electromechanical transducers, the interference acceleration can thus be compensated.

A sensor of this type can be used, e.g., in a motor vehicle for controlling, in particular, safety devices in open loop, or for controlling the driving dynamics in closed loop.

It turns out in practice, however, that both transducers are neither entirely identical nor entirely selective as to direction. They even supply a signal when they are not deflected in the main detecting direction, especially in the driving (actuation) direction as well. This signal exists as a modulated signal together with the specific driving speed; following demodulation, it produces an output offset and can only be compensated when it is at least stable in phase. Therefore, for the driving, the excitation speed of each vibration mass 1, 2 and, thus, the Coriolis useful signal must exist in phase opposition. Therefore, the present invention proposes keeping the interference effect, which influences the opposite-phased vibration response, small by using structural design measures. This is essentially achieved in that the coupling mass 3 is much smaller than that of the resonating masses 1, 2, the resonating masses 1, 2 not necessarily having to be identical. The advantages of a small coupling mass are further enhanced when the suspension springs are very soft in the vibrating direction. Normal to the plane of vibration, the suspension springs 6 have a relatively stiff design due to the corresponding cross-sectional proportions. Given a plurality of parallel configured partial springs, a corresponding number of printed conductors can be routed to the outside. Because of the soft suspension springs 6, even substantial temperature influences do not result in any changes in amplitudes and phases between the two resonating masses 1, 2, so that the vibration system is insensitive to interference effects.

Since one endeavors to select a low working frequency for the rpm sensor in the interest of having a high sensitivity, at a given minimal sensor surface, the resonating masses 1,2 are selected to be as large as possible, the spring lengths are designed to be as long as possible and the spring widths as narrow as possible.

Figure 4:
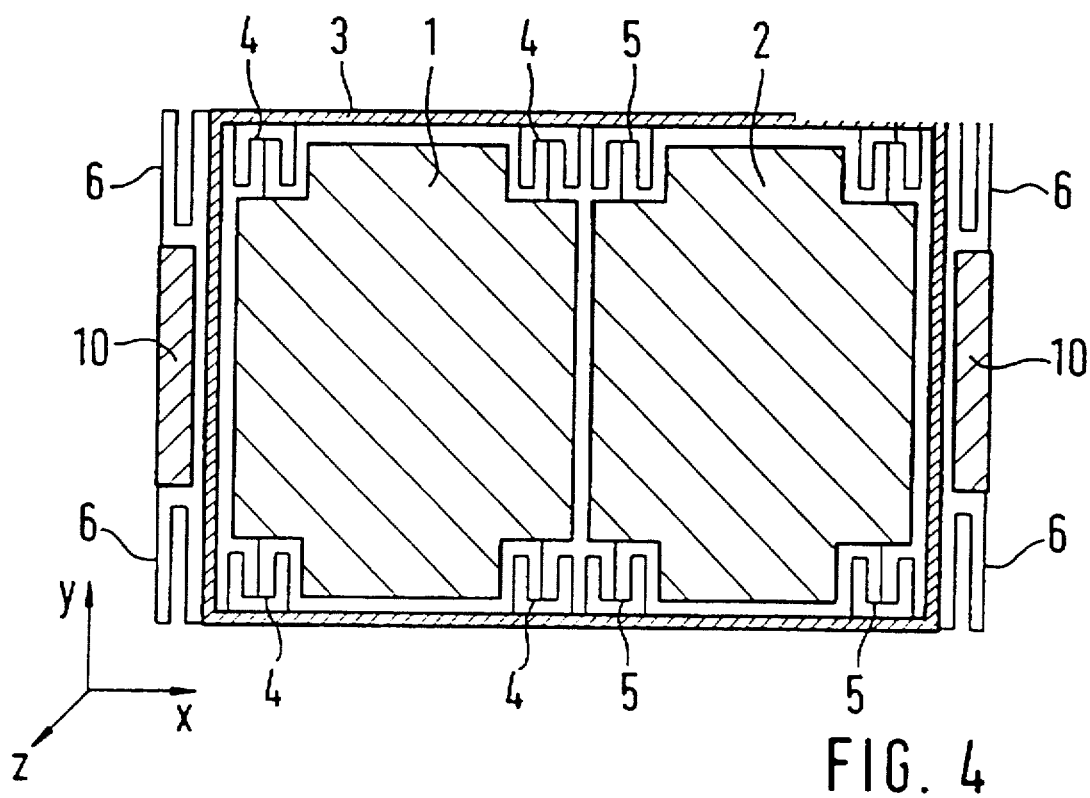
FIG. 4 illustrates a first exemplary embodiment according to the present invention.

A first exemplary embodiment is shown in FIG. 4. The coupling region, together with the coupling mass 3, consists of a frame 3, which encloses the resonating masses 1, 2 all around. Each resonating mass 1, 2 is joined via resonating springs 4, 5 to the frame 3. The frame 3 is connected via the suspensions springs 6 to the substrate 10. Both the resonating springs 4, 5, as well as the suspensions springs 6, have a folded configuration, to increase their length. They can be realized as two or more parallel partial springs.

Figure 5:
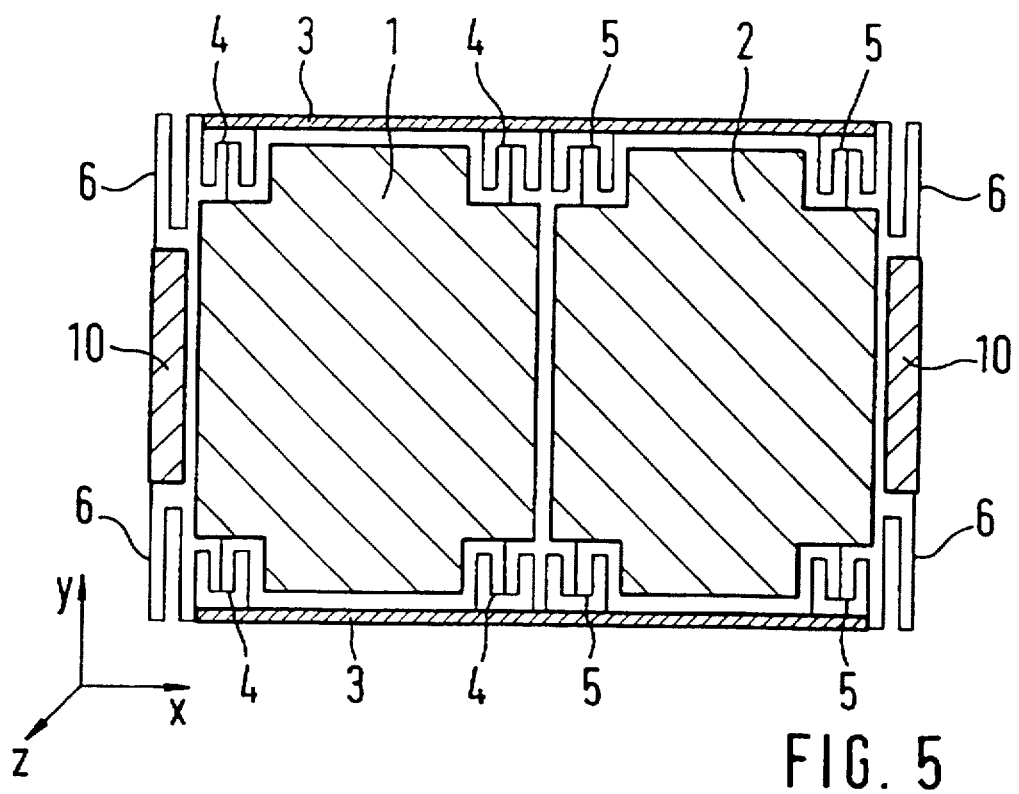
FIG. 5 illustrates a second exemplary embodiment according to the present invention.

FIG. 5 shows a second exemplary embodiment, in which, however, the frame 3 is formed only on two opposing sides. Consequently, the frame, as the coupling mass 3, has a smaller design than in the first exemplary embodiment. Here, the resonating masses 1, 2 are coupled at two opposing sides via the resonating springs 4, 5 to the frame sections 3. The frame sections 3, in turn, are connected via suspension springs 6 to the substrate 10. The advantage of the two-part frame is the lessening of the danger of non-linear vibrations, a reduced sensor surface, and a larger clearance between the modes in the z-direction or about the y-axis. As a result, this arrangement has a greater stiffness in the Coriolis direction.

Figure 6:
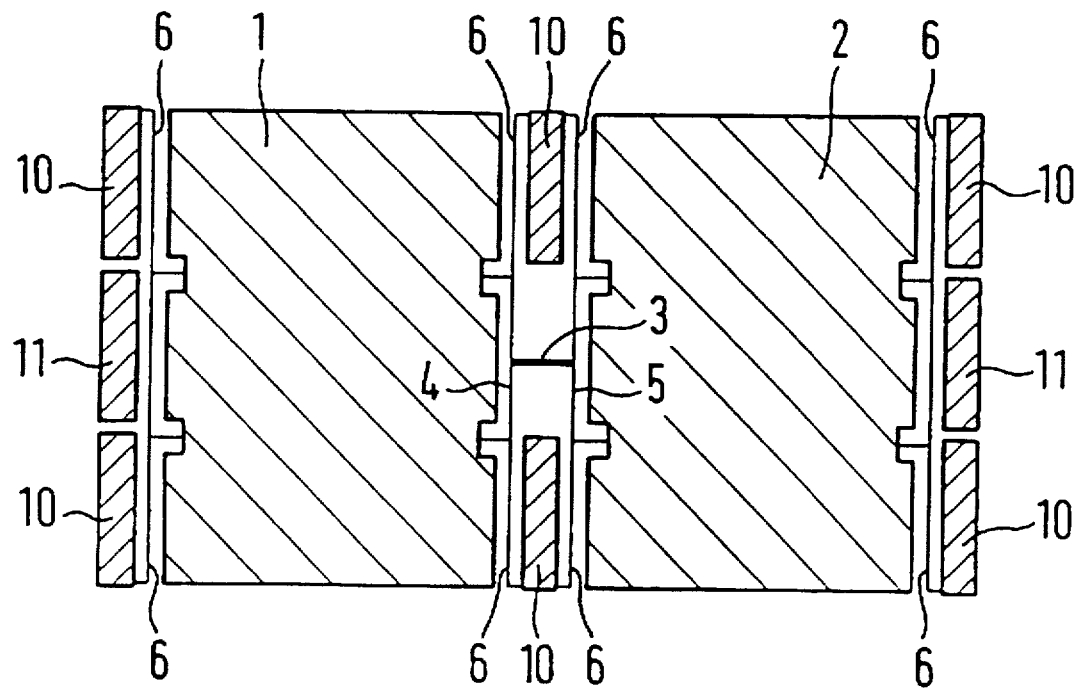
FIG. 6 illustrates a third exemplary embodiment according to the present invention.
Figure 7:
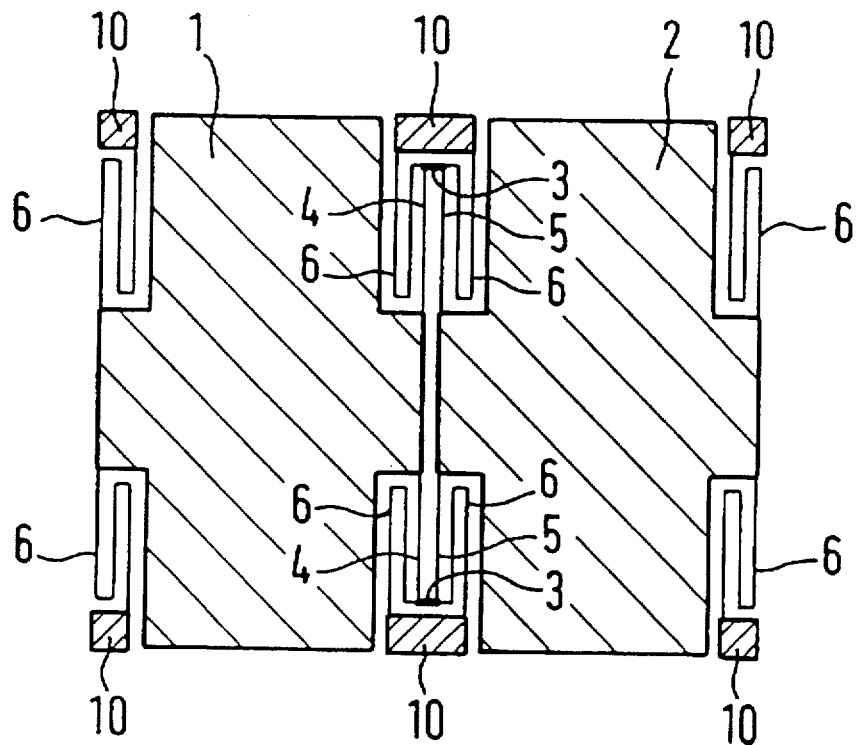
FIG. 7 illustrates a fourth exemplary embodiment according to the present invention.

In the third exemplary embodiment corresponding to FIG. 6 and in the fourth exemplary embodiment corresponding to FIG. 7, the coupling mass 3 has been reduced further. In place of the frame sections, a web 3 (FIG. 6) or two webs 3 (FIG. 7) are now formed between the two resonating masses 1, 2. These webs 3 are connected, on the one hand, via the resonating springs 4, 5 to the resonating masses 1, 2. On the other hand, they are joined via the suspension springs 6 to the substrate 10. The resonating masses 1, 2 are also connected via further suspension springs 6 to the substrate 10. In addition, in the exemplary embodiment of FIG. 6, a structure 11 is provided, which is designed as a finger-type structure and is suitable for a capacitive drive or for a reference signal. The additional suspension springs 6 have the effect of producing high natural frequencies of the modes in the z-direction or about the y-axis (modes in Coriolis direction), which would not be possible with a purely mid-suspension. The coupling mass 3 is so small in this case that its mass can be disregarded.

What is claimed is:

1. A micromechanical resonator of a vibration gyrometer for detecting a rate of rotation utilizing a Coriolis force, comprising:

a substrate;

first and second resonating masses vibrating in phase opposition in a preselected direction in a preselected plane;

first and second suspension springs coupled, on one end, to the substrate and, on the other end, to the first and second resonating masses, respectively, the first and second suspension springs being softer in the direction of vibration of the first and second resonating masses than in any other direction;

detecting elements measuring the Coriolis force which is induced on the first and second resonating masses in a further direction, the further direction being perpendicular to the direction of vibration; and a coupling region mechanically coupling the first resonating mass to the second resonating mass, the coupling region including a coupling mass and at least one resonating spring.

2. The resonator according to claim 1, wherein the at least one resonating spring includes a first resonating spring coupled between the first resonating mass and the coupling mass, and a second resonating spring coupled between the second resonating mass and the coupling mass.

3. The resonator according to claim 1, wherein the first suspension spring is arranged parallel to the second suspension spring.

4. The resonator according to claim 1,
wherein the at least one resonating spring includes at least two resonating springs, and
wherein the coupling region is coupled to one of the first and second resonating masses via the at least two resonating springs.

5. The resonator according to claim 4, wherein the at least two resonating springs include:
a first pair of resonating springs coupled between the first resonating mass and the coupling mass, and
a second pair of resonating springs coupled between the second resonating mass and the coupling mass.

6. A micromechanical resonator of a vibration gyrometer for detecting a rate of rotation utilizing Coriolis forces, comprising:

a substrate;

first and second resonating masses vibrating in phase opposition in a preselected direction in a preselected plane;

first and second suspension springs coupled, on one end, to the substrate and, on the other end, to the first and second resonating masses, respectively, the first and second suspension springs being softer in the direction of vibration of the first and second resonating masses than in any other direction;

a coupling region mechanically coupling the first resonating mass to the second resonating mass, the coupling region including a coupling mass and at least one resonating spring; and a third suspension spring joined to the coupling region.

7. The resonator according to claim 6, wherein at least one of the first, second and third suspension springs is softer than the resonating spring in the direction of vibration.

8. The resonator according to claim 6, wherein the first suspension spring is arranged parallel to the second suspension spring which is, in turn, arranged parallel to the third suspension spring.

* * * * *